(12) United States Patent
Anderson et al.

(10) Patent No.: US 9,541,999 B2
(45) Date of Patent: Jan. 10, 2017

(54) THREE DIMENSIONAL HUMAN-COMPUTER INTERFACE

(75) Inventors: Paul Anderson, Kilmacolm (GB); Saquib Ibrahim, Glasgow (GB)

(73) Assignee: F. POSZAT HU, LLC, Wilmington, DE (US)

( * ) Notice: Subject to any disclaimer, the term of this patent is extended or adjusted under 35 U.S.C. 154(b) by 2896 days.

(21) Appl. No.: 11/938,218

(22) Filed: Nov. 9, 2007

(65) Prior Publication Data

US 2008/0068376 A1 Mar. 20, 2008

Related U.S. Application Data

(63) Continuation of application No. 10/276,992, filed as application No. PCT/GB01/02144 on May 17, 2001, now Pat. No. 7,312,786.

(30) Foreign Application Priority Data

May 22, 2000 (GB) .................................. 0012275.4

(51) Int. Cl.
  *G06G 5/00* (2006.01)
  *G06F 3/01* (2006.01)
  *G06F 3/0484* (2013.01)

(52) U.S. Cl.
  CPC ........... *G06F 3/014* (2013.01); *G06F 3/04845* (2013.01)

(58) Field of Classification Search
  CPC ............................. G06F 3/014; G06F 3/04845
  USPC ................... 345/204, 156–158, 163
  See application file for complete search history.

(56) References Cited

U.S. PATENT DOCUMENTS

| 5,583,977 | A |   | 12/1996 | Seidl |
| 5,588,098 | A | * | 12/1996 | Chen et al. ................... 345/653 |
| 5,670,987 | A |   | 9/1997  | Doi et al. |
| 5,821,925 | A | * | 10/1998 | Carey et al. .................. 715/757 |
| 5,831,584 | A |   | 11/1998 | Socks et al. |
| 5,886,818 | A |   | 3/1999   | Summer et al. |

(Continued)

FOREIGN PATENT DOCUMENTS

| JP | H07-114451 A | 5/1995 |
| JP | 9180003 | 7/1997 |
| KR | 1020030024681 A | 3/2003 |
| WO | 95/19584 A1 | 7/1995 |
| WO | 01/90870 A1 | 11/2001 |

OTHER PUBLICATIONS

Yukihiro Hirata, et al.: "3-Dimensional Interface Device for Virtual Work Space" Proceedings of the IEEE/RSJ International Conference on Intelligent Robots and Systems. Raleigh, NC., Jul. 7-10, 1992, New York, IEEE, US, vol. 2, Jul. 7, 1992 (Jul. 7, 1992), pp. 889-896, XP000333985 ISBN: 0-7803-0738-0.

(Continued)

*Primary Examiner* — Dorothy Harris
*Assistant Examiner* — Leonid Shapiro
(74) *Attorney, Agent, or Firm* — Schwabe, Williamson & Wyatt

(57) ABSTRACT

A system includes a three dimensional display device configured to project computer generated controls and a target image in a three dimensional target volume; and an actuator configured to be worn by an operator. The system further includes one or more sensors configured to sense a movement of the actuator, wherein the controls are configured to be manipulated corresponding with the movement of the actuator within the target volume to alter an appearance of the target image.

21 Claims, 2 Drawing Sheets

(56) References Cited

U.S. PATENT DOCUMENTS

| | | | |
|---|---|---|---|
| 5,905,499 | A | 5/1999 | McDowall et al. |
| 6,211,848 | B1 | 4/2001 | Plesniak et al. |
| 6,388,657 | B1 * | 5/2002 | Natoli .......................... 345/168 |
| 6,720,949 | B1 * | 4/2004 | Pryor et al. ................... 345/158 |
| 6,924,787 | B2 | 8/2005 | Kramer et al. |
| 7,312,786 | B2 | 12/2007 | Anderson et al. |

OTHER PUBLICATIONS

Ronald T. Azuma: "A Survey of Augmented Reality" Presence, Cambridge, MA, US, Aug. 1997 (Aug. 1997), pp. 1-48, XP002254668.

European Patent Office, International Search Report for PCT/GB2001/002144, dated Oct. 30, 2001; 3 pages.

Hirata, Y. et al; "3-Dimensational Interface Device for virtual Work Space"; Proceedings of the IEEE/RSJ international Conference on Intelligent Robots and Systems; Raleigh, NC; Jul. 7-10, 1992; vol. 2; pp. 889-896; XP000333985; ISBN: 0-7803-0738-0.

Stolowitz Ford Cowger LLP, "Listing of Related Cases", Jun. 13, 2013, 1 page.

Haruo Noma, Force and Visual Feedback for Manipulation Aid in Virtual Space, Vo. 95, No. 524 IEICE Technical Report, The Institute of Electronics, Information and Communication Engineers, Feb. 16, 1996, vol. 95, No. 524, pp. 9-18.

Shinji Uchiyama, Presentation and Interaction of Virtual 3D Objects without Geometric Model, vol. 3, No. 3, Transactions of the Virtual Reality Society of Japan, The Virtual Reality Society of Japan, Sep. 30, 1998, vol. 3, No. 3, pp. 149-157.

* cited by examiner

THREE DIMENSIONAL HUMAN-COMPUTER INTERFACE

The present application is a continuation of U.S. patent application Ser. No. 10/276,992 entitled Three Dimensional Human-Computer Interface, filed on Dec. 16, 2003, which is a US national phase application of PCT/GB2001/02144 filed, on May 17, 2001, and claiming priority to GB0012275.4, filed on May 22, 2000, each of which are herein incorporated by reference in their entirety.

This invention relates to a three dimensional (3D) Human-Computer Interface (HCI), and a method of interacting with a 3D HCI. More specifically, it relates to a system of controls, sensors, tools and actuators that are designed to allow for easy manipulation of images, and any other data that is capable of being projected onto a 3D display system. The sensors and actuators extend in scope to body worn controls such as may be incorporated into a glove or into headgear, or other body worn apparatus, and to audio systems.

PRIOR ART

HCIs exist that have sensors mounted in items of clothing such as gloves. They are normally employed where the user of such a system is wearing a helmet mounted display. Sensors within the glove are used to communicate the position of the user's hand so that a "virtual" hand can be drawn onto the user's display. This way he can know the whereabouts of his hand in relation to other elements of the image.

This has the disadvantage that the user does not get a complete view of his hand, and any subtleties of motion that he is making will be lost. This occurs due to the limited number of sensors on the glove providing a finite resolution, coupled with inevitable errors and delays in the system that plot the position of the hand on to the display.

SUMMARY OF INVENTION

The present invention does not suffer these problems. Following calibration no "virtual" hand need be displayed. This will avoid problems of over correction present in the prior art that occur due to delay in updating the image as seen by the user whenever a hand movement is made. As the user of the present invention can see what hand movement has been made, he will not feel the need to redo them, or exaggerate the motion as he waits for the display to update.

There are HCI systems in existence that consist of haptic interfaces that provide hand positional information and haptic feedback that are used with two dimensional image projection systems such as conventional computer monitors. These systems, although giving an increased impression of reality are constrained significantly by the imaging system in providing a natural design environment in which to work. To counter this, there are 3D visualisation systems, such as the CAVE system supplied by the Virtual Environment Lab, Virginia Tech, Blacksburg Va. 24081, which provide the operator with a true 3D image along with haptic feedback. This is a fully immersive system consisting of a room, onto the walls of which are projected images that are viewed as 3D using a suitable headset. These systems, although useful for visualisation, are not currently suited for design work. Thus they would only be used practically for briefings, demonstrations etc, to provide a more impressive, or more memorable presentation.

According to the present invention there is provided a Human-Computer Interface that comprises a set of sensors, actuators and computer generated controls, characterised in that the controls are projected in three spatial dimensions by a three dimensional display device and are manipulated by means of an operator interacting with them by movements of the operator's body, these movements being detected using the sensor system, where characteristics of a displayed target volume change according to the movement made, and actuators worn on the body react according to how the body interacts with the computer generated controls.

The advantages of this invention are that a natural and intuitive interface is provided that has the effect of simplifying the process of designing articles using a Computer Aided Design (CAD) system. The interface as described herein provides tools that are capable of manipulating images very quickly and naturally. As the HCI will be used on a 3D display system that is connected to a computer system, this also enables remote users to access the system by means of having their own 3D display connected to the same computer system by means of a network system.

The present invention provides the operators with an environment in which they can operate and interact with the computer, and hence the displayed design article, more naturally than using the systems of the prior art. It is a practical system that is readily useable for the purpose of design, or for demonstration of a design, and is also suitable to be used to give briefings and presentations to non-technical staff or customers. The design article to be displayed, or manipulated by the current invention will generally comprise of a 3D image and is known in this specification as a target volume.

The present invention could be fitted on to an existing system that incorporates a 3D display and haptic interface such as the prior art described above to provide the user, or operator, with a set of controls that are operated in a natural, intuitive manner that allow various parameters of a target volume to be adjusted.

The hand and forelimbs will be the most common part of the body used to adjust controls but it will be understood that any part of the body may be used if the sensor system is capable of detecting the position of that part of the body. Any reference to "hand", and to "glove" in this specification should be read in this context.

The present invention provides a set of interactive 3D icons that act as controls to, amongst other things, resize the target volume, or rotate it or move it linearly, in any of 3 spatial dimensions. Certain special types of controls that are projected in two dimensional (2D) form, and are known in the context of this specification as menu items may be displayed along with the 3D controls and can be used to control additional functions of the computer system.

The controls may be projected alongside the target volume, and the purpose of manipulating the controls is to change the view of the target volume. The target volume itself may be a control, or may have controls within it such that the target volume may be manipulated directly, without reference to other controls.

In use, the operator would choose an appropriate control for the operation he wishes to perform, and would reach out towards it. He is able to see the position of his hand, and so knows where the chosen control is in relation to his hand position. The computer system is able to know the position of the operator's hand by virtue of the sensors attached to it, and so also knows where the hand is in relation to the controls being projected. When the system detects that the hand has "contacted" a control it sends a feedback signal back to the actuators on the glove which will move in response to this "contact". This is known as haptic feedback. There are generally two types of haptic feedback. The first, known as "force feedback" can act upon the hand to stiffen its movements with varying degrees of force, to simulate contact with different types of materials. A mild stiffness will tend to feel like the user is holding something spongy, or the stiffness could vary according to how far the fingers moved, which would simulate a rubbery texture. Of course, in this context, "contact" does not mean the actual touching of two physical objects, but instead refers to the apparent touching of the hand/glove combination, or other body part, with the 3D image of a control that is being projected by the projection system.

When a contact with the control takes place, the computer system will understand that some manipulation of the control is intended by the operator. Further movements of the operators hand while it is in contact with the control, or while the control interprets the hand movements as applying to it, will be interpreted as attempts to change one or more of the parameters that may be adjusted with that control. Such movements made by a hand may be, but are not limited to, fingers moving in relation to each other, fingers moving in relation to the palm, rotations of the hand etc. Some controls may require that two hands are needed in order to modify a particular parameter. The appearance of the control itself can change according to the value of the parameter that is adjusted by that control. For example, a control that adjusts the size of the target volume may itself get smaller or larger according to the value to which the parameter is presently set. Or, the control may be drawn such that it appears to be an image within an image, such that a smaller image appears to be encased within a larger one. As the parameter is adjusted the relative sizes or positions of the two images changes accordingly. As another example, the control could be drawn as a cylinder, with various parameter options drawn onto the surface of the cylinder. In use, the cylinder could be spun around using the hand, or other part of the body, until the desired parameter option can be conveniently chosen.

The usual image manipulation tools that are provided in more conventional CAD software may be beneficially adapted to work under this system.

The type of feedback applied to the hand will vary according to the type of control that is contacted. Some controls will react so that, when contact is made with them a signal is sent to the glove to lock the position of the fingers. This gives the impression to the operator of touching a solid object. Other controls will react with a lesser feedback force to give the spongy feeling described above. In the context of this specification this is known as grasping. Other controls operate differently. The operator is able to immerse his hand into this sort of control, and influence parameters by means of movements of his hand whilst within the control. These are known as gesture controls. Certain menu items may be displayed in two dimensions. If the operator were to bring his finger into contact with one of these menu items the glove will exert a mild pressure on the finger to simulate the feeling of touch. Although described here are three different haptic feedback mechanisms, they are not mutually exclusive—i.e. more than one can be used simultaneously if appropriate for the type of control being used.

Before the HCI can be used, it should be calibrated. This process is used to synchronise the position of the operator's body in space with the position as seen by the computer system. Any differences in position, or action such as grasping or gesturing as seen by the operator and the computer system is accounted for by the computer system such that the operator does not notice the error.

The HCI as described herein is capable of being used on a computer system that has a 3D display. Of course, the computer system need not be in direct proximity to the display, but could be connected across a network of interconnecting computers. Existing software and hardware tools ran be used to implement the HCI.

One example of such a HCI will now be described, with reference to the accompanying drawings.

DETAILED DESCRIPTION

Figure 1:
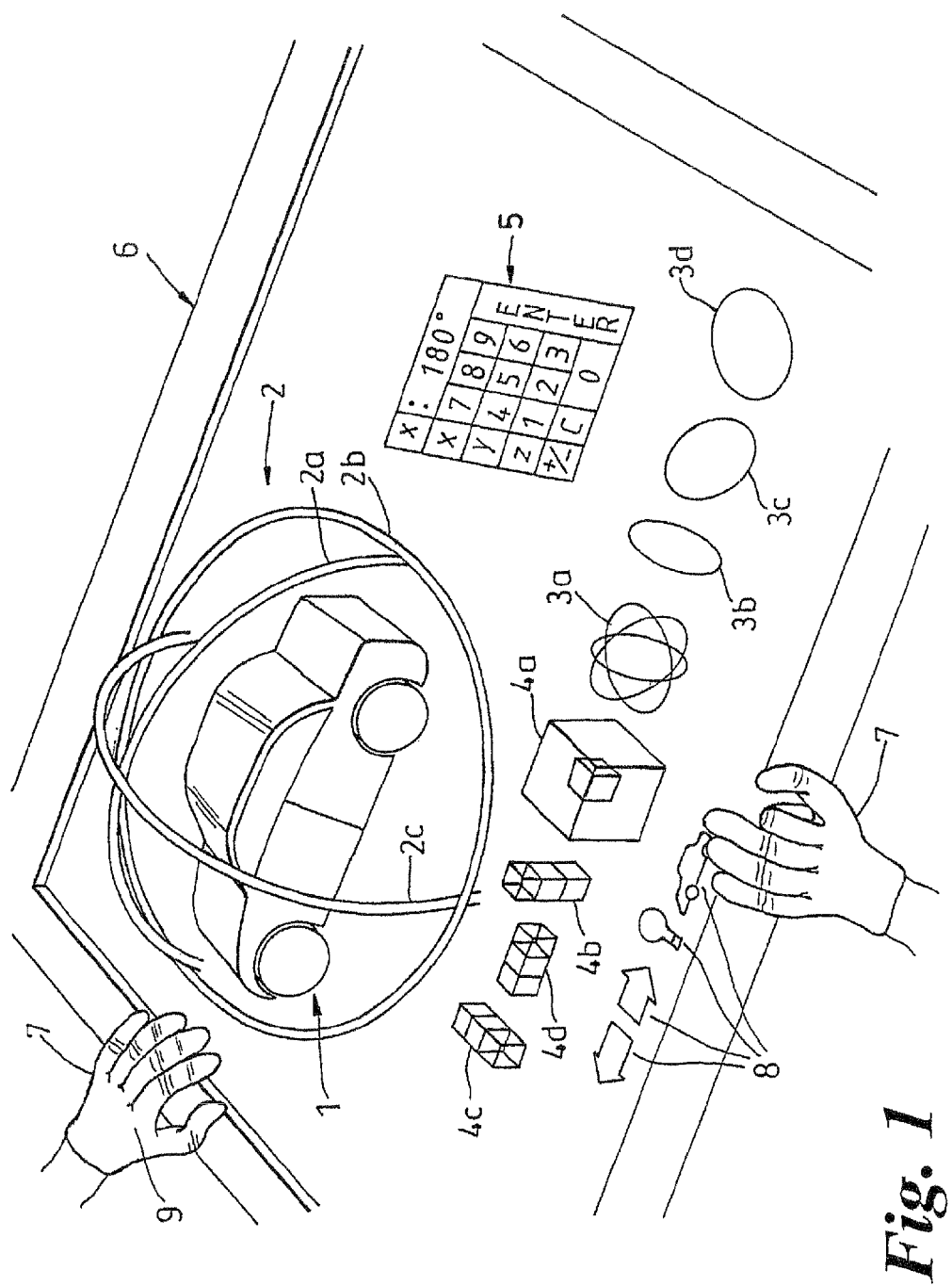
FIG. 1 shows a 3D workstation 6 displaying a target volume 1 and several controls 2, 3, 4, along with the hands of two operators 7.

The 3D workstation used is manufactured by Fakespace Labs, Inc. of 241 Polaris Ave. Mountain View Calif. 94043, USA, and provides a desk, above and upon which is presented a 3D image. The haptic feedback gloves are manufactured by Virtual Technologies Inc. of 2175 Park Boulevard, Palo Alto, Calif. 94306. The sensor system for detecting the position of the gloves and head in space is provided by Polhemus Inc. of 1 Hercules Drive, PO Box 560, Colchester, Vt., 05446.

The person operating the HCI wears haptic feedback gloves 9 that are fitted with an array of sensors and/or actuators. The system as currently employed has a separate glove incorporating the force feedback mechanism from the glove that incorporates the touch actuators, although these can also be incorporated into the same glove. These provide the computer system with information as to the position of the hands 7, and also exhibit forces on the fingers to provide feedback that simulates what is felt when touching or grasping objects.

Before the system can be used accurately the sensor system must first be calibrated. This is done by having the computer display a "virtual" hand in a position according to where it detects the operator's hand as being. The operator then moves his own hand, if necessary, to be closely aligned to the virtual hand, and then provides an indication to this effect to the computer.

The present system also requires that the gesture and grasping action is similarly calibrated. This is done by touching one's thumb against the end of each of the fingers in turn for each hand. The virtual hand display is then switched off. The computer then calculates any error in the original positioning and subtracts this error when performing its subsequent calculations.

The target volume 1 is surrounded by a rollcage 2 that comprises three loops, 2a, 2b. 2c. Each loop 2x is orthogonal to the other loops of the rollcage. The rollcage 2 acts as a control and can be used to rotate the target volume 1 about the centre of the rollcage 2. This can be accomplished by means of the operator grasping one of the loops 2x of the rollcage 2 with his hand, and manipulating the loop according to the movement required. For example, to rotate the target volume about the vertical axis, the operator will grasp one of the loops 2a, 2c that has a main vertical dimension and spin it sideways until the target volume shows the desired view. Or, the operator can grasp the horizontal loop 2b and rotate this. The design of the rollcage 2 is such that is can also be rotated by any of the loops 2x in any rotational axis. Here, "rotate" should be taken to mean that a gesture imitating that of rotating a physical ring is made.

FIG. 1 also shows some controls towards the bottom of the picture. Some of these controls can also be used to rotate the target volume 1. Controls 3x, of which 3a shows a rollcage in miniature, and 3b, 3c and 3d show each individual loop of the rollcage 3a, can also be used to rotate the target image in a similar manner to the full size rollcage 2. Loops 3b, 3c and 3d can be grasped by the operator and rotated, which will have the effect of rotating the target volume about that particular loop's axis. When the operator's hand 7 gets close enough to the control 3, actuators in the glove 9 operate to resist movement of the fingers, to simulate the touching of a solid object.

Also shown in FIG. 1 are four controls 4x that are used to resize the target volume 1. These are gesture icons. Each of these is drawn as a central cube with, in three cases 4b, 4c, 4d, shadow extensions in one dimension (all orthogonal to each other), and in the last case 4a a larger shadow cube enveloping a smaller one. To effect a resize, the operator places his hand 7 in contact with the chosen control and either moves his finger's to make a fist, or spreads his fingers out, which has the effect of making the target volume 1 smaller or larger respectively, Choosing a control with single dimension shadows will only resize the target volume 1 in that dimension, whereas choosing the control 4a with shadows in three dimensions will resize in all dimensions simultaneously.

FIG. 1 shows some other menu items 8 that are displayed in 2D format. When the operator's finger is brought into contact with one of these menu items the glove 9 will exert a mild pressure on the finger to simulate the feeling of touch. One such example of a 2D menu item is the keypad 5. This is used to input numerical data for any parameter that is capable of being controlled in this way.

All controls 2, 3, 4, 5, 8, and the target volume 1 are capable of being repositioned as desired by the operator, within the limitations of the display system 6, by grasping and pulling them to the desired position.

Figure 2:
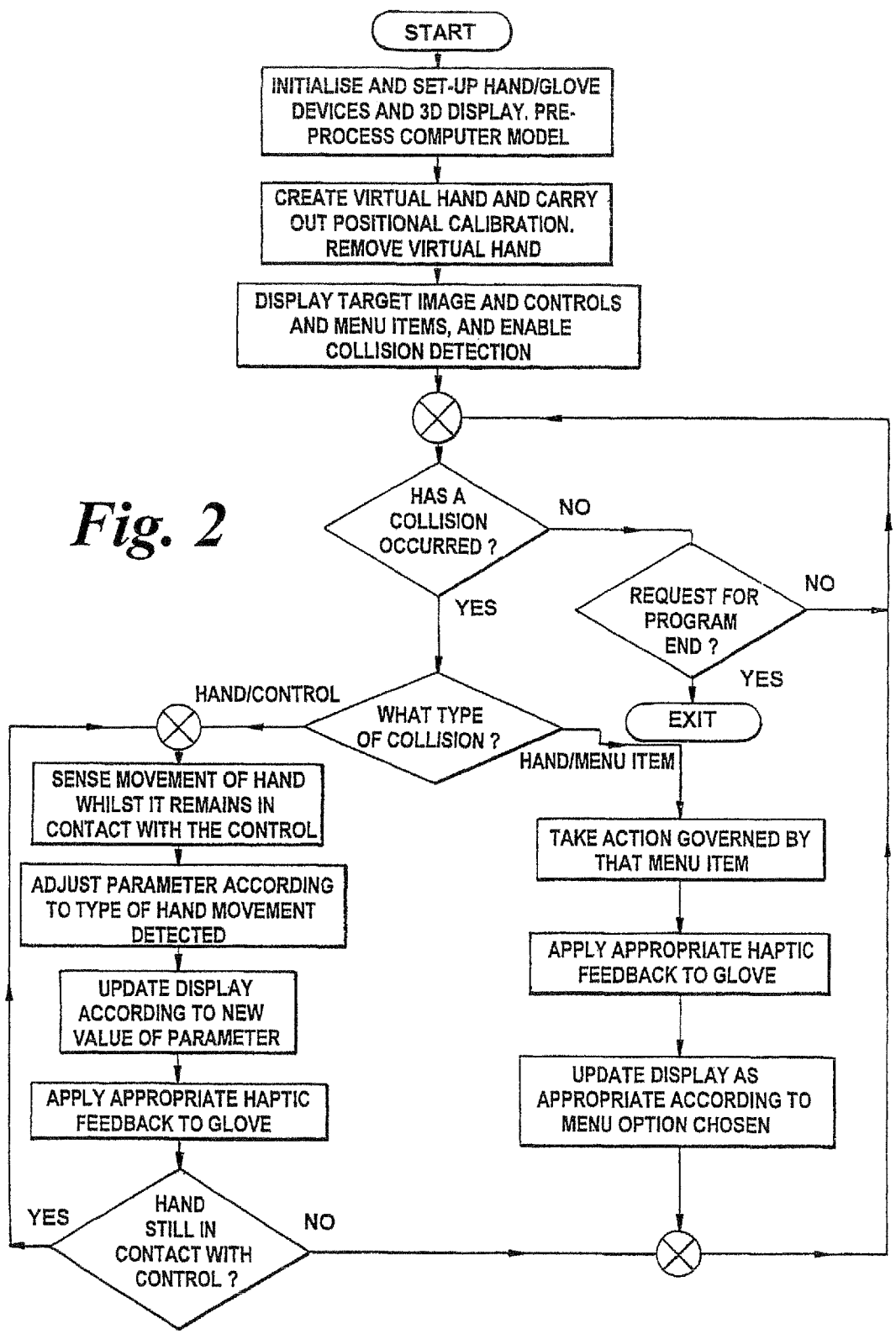
FIG. 2 shows in block representational form the functionality of the computer code that provides this HCI.

FIG. 2 shows a simplified schematic of the operation of the computer program that controls both the behaviour of the target volume and the controls and menu items projected by the 3D display. When the HCI computer code is activated the following steps are carried out:

a. Initialise body worn hardware, such as the gloves and any head gear that may be worn. Initialise sensor system. Pre-process the computer model that is to be used as the target volume such that it is prepared for display on the 3D display system. This is necessary so that it is provided with information on how to react with the haptic sensors within the gloves.

b. Initialise the 3D display unit, and create the image of a virtual hand for calibration purposes as described above. Carry out the calibration.

c. Display the 3D target volume and a set of controls and menu items. Enable the collision detection, i.e., activate the haptic feedback to the glove if it is sensed that the glove contacts with a control or menu item, and take appropriate action according to which control or menu item is contacted. Wait for collisions to occur or for the program to be ended.

d. If a collision is detected then take the following actions as appropriate:

e. If a hand-control collision, continue to sense the movements made by the hand as long as it stays in contact with the control. Adjust the parameter controlled by the control according to the movements made, and update the target volume display and control icon according to the new value of the parameter. Apply appropriate haptic feedback signals to the glove. Continue doing this process until it is detected that the hand is no longer in contact with the control.

f. If a hand-menu item collision, take the action governed by that menu item, and adjust the target value display and menu item icon as necessary. Apply appropriate haptic feedback signals to the glove.

g. Wait for more collisions to occur, or for program to be terminated. If a further collision is detected, then go back to step d. above.

The invention claimed is:

1. A system comprising:
    a three dimensional display device configured to project computer generated controls and to project a target image in a three dimensional target volume, wherein the computer generated controls comprise two or more loops that substantially surround the target image, wherein each of the two or more loops corresponds with a dimensional plane of the three dimensional target volume;
    an actuator configured to be worn by an operator; and
    one or more sensors configured to sense a movement of the actuator, wherein the computer generated controls are configured to be manipulated corresponding with the movement of the actuator within the three dimensional target volume, and wherein a manipulation of one of the two or more loops alters a size of the target image in the corresponding dimensional plane of the three dimensional target volume.

2. The system according to claim 1 wherein the two or more loops are located orthogonally to each other.

3. The system according to claim 1 wherein the actuator is configured to be worn on an operator's hand.

4. The system according to claim 1 wherein the computer generated controls are further configured to be manipulated by immersing the actuator into one or more of the computer generated controls and moving the actuator.

5. The system according to claim 1 wherein movement of the actuator generates a haptic feedback response when the actuator contacts one or more of the computer generated controls.

6. The system according to claim 5 wherein the haptic feedback response simulates contact with one or more of the computer generated controls by providing a resistance to further movement of the actuator.

7. The system according to claim 1 wherein an appearance of one or more of the computer generated controls changes substantially simultaneously as the appearance of the target image is altered.

8. The system according to claim 1 wherein the computer generated controls are further configured such that manipulation of any of the two or more loops rotates the target image in the corresponding dimensional plane of the three dimensional target volume.

9. The system according to claim 1 wherein a manipulation of all of the two or more loops alters the size of the target image in three dimensions.

10. A method comprising:
    displaying a three dimensional image in a target volume;
    displaying a computer generated operator control comprising two or more orthogonal loops, wherein each of the two or more orthogonal loops corresponds with a dimensional plane of the three dimensional image;

detecting movement of an actuator positioned in the target volume, the operator control responsive to a selection of one of the two or more orthogonal loops by the actuator; and varying a size of the three dimensional image, according to the selection of the one of the two or more orthogonal loops, in the corresponding dimensional plane.

11. The method according to claim 10 further comprising detecting movement of the actuator within the operator control, wherein a manipulation of any of the two or more orthogonal loops responsive to movement of the actuator causes the three dimensional image to rotate in the corresponding dimensional plane.

12. The method according to claim 11 wherein a manipulation of all of the two or more orthogonal loops causes the three dimensional image to rotate in three dimensions.

13. The method according to claim 10 wherein the actuator is configured to be worn on an operator's hand.

14. The method according to claim 13 wherein the actuator is configured to detect a change in position of the operator's hand from a clenched first to fingers spread out.

15. The method according to claim 10 wherein the two or more orthogonal loops substantially surround the three dimensional image.

16. The method according to claim 10 wherein a manipulation of all of the two or more orthogonal loops causes the size of the three dimensional image to vary in three dimensions.

17. The method according to claim 10 wherein the operator control appears as a first image encased within a second image, and the relative sizes of the first and second images change in response to the movement of the actuator.

18. A human-computer interface comprising:

means for displaying a three dimensional image in a target volume;

means for displaying one or more computer generated operator controls comprising three loops surrounding the three dimensional image, wherein the three loops are located orthogonally to each other, and wherein each of the three loops corresponds with a dimensional plane of the three dimensional image; and means for detecting movement of an actuator positioned in the target volume, the one or more operator controls responsive to the movement of the actuator, wherein each of the three loops operates to vary a size of the three dimensional image in the corresponding dimensional plane.

19. The human-computer interface according to claim 18 wherein each of the three loops further operates to rotate the three dimensional image in the corresponding dimensional plane.

20. The human-computer interface according to claim 18 wherein the actuator is configured to be worn on an operator's hand.

21. The human-computer interface according to claim 20 wherein the movement of the actuator corresponds to simultaneous movement of the operator's hand within the target volume.

* * * * *